United States Patent [19]

Collins

[11] Patent Number: 5,491,881
[45] Date of Patent: Feb. 20, 1996

[54] PROCESS FOR FORMING ROLLER GUIDE FRAMES FOR A FISHING LINE

[76] Inventor: Stuart Collins, 526 NE. 190th St., North Miami Beach, Fla. 33179

[21] Appl. No.: 218,367

[22] Filed: Mar. 28, 1994

[51] Int. Cl.$^6$ .................................................. B23P 17/00
[52] U.S. Cl. .................................. 29/417; 43/24; 72/337
[58] Field of Search .............................. 29/417; 72/334, 72/337; 43/24

[56] References Cited

U.S. PATENT DOCUMENTS

| | | | |
|---|---|---|---|
| 3,107,566 | 10/1963 | Archer | 29/417 |
| 3,641,696 | 2/1972 | Fleischer | 43/24 |
| 4,360,959 | 11/1982 | Johannesen | 29/417 |
| 4,428,141 | 1/1984 | Kovalovsky | 43/24 |
| 4,507,891 | 4/1985 | Ohmura | 43/24 |
| 4,677,720 | 7/1987 | Alling et al. | 29/417 X |
| 5,276,991 | 1/1994 | Stotesbury et al. | 43/24 |

*Primary Examiner*—S. Thomas Hughes
*Attorney, Agent, or Firm*—Malloy & Malloy

[57] ABSTRACT

A process for forming a support frame for a roller guide of the type designed to be mounted on a conventional fishing rod by means of continuously supplying an elongated metallic material strip of predetermined width to a plurality of adjacently positioned and simultaneously operable work stations each of which is defined by punching or stamping facilities such that the strip is moved along a path of travel defined by the work stations in a "stop and go" mode wherein the strip is stopped at each work station for simultaneously forming and shaping at each location to produce a semi-formed roller guide frame and further wherein the last, end most work station completes the shaping on the elongated strip to produce a formed roller guide frame which is simultaneously severed from the remainder of the strip and semi-formed work guides.

7 Claims, 2 Drawing Sheets

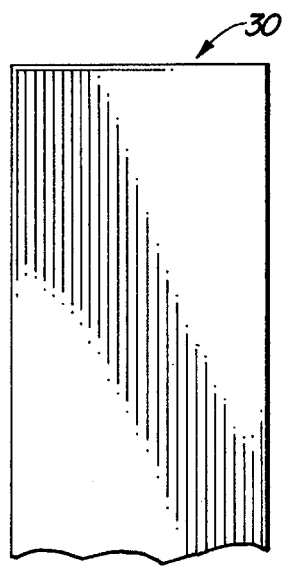
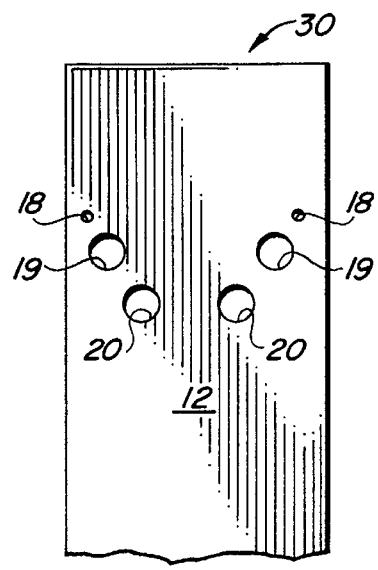
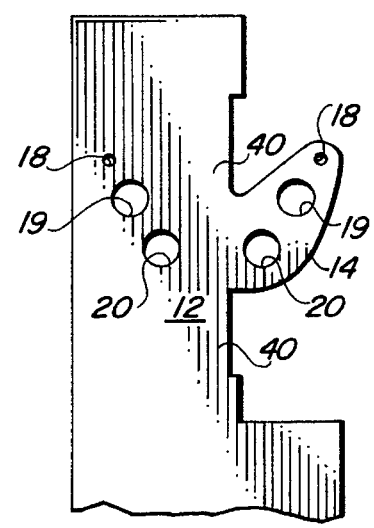
FIG. 1   FIG. 2   FIG. 3
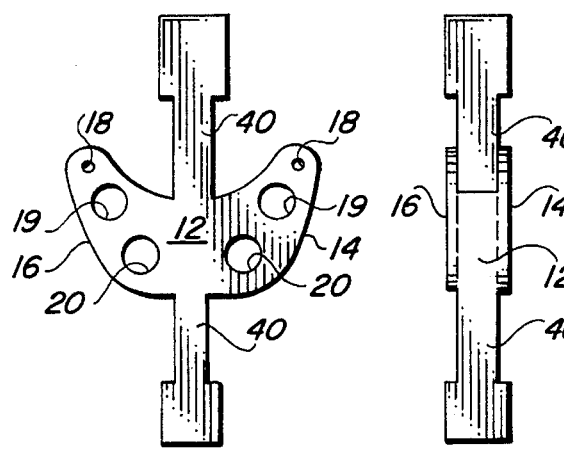
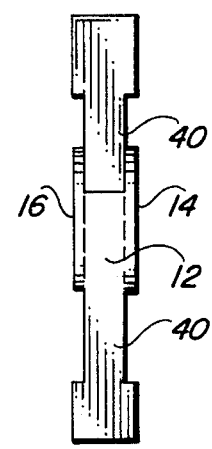
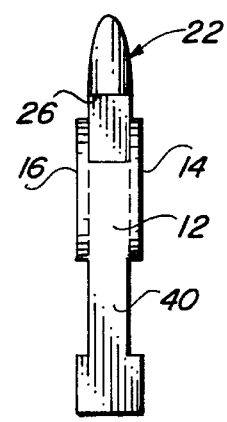
FIG. 4   FIG. 5   FIG. 6
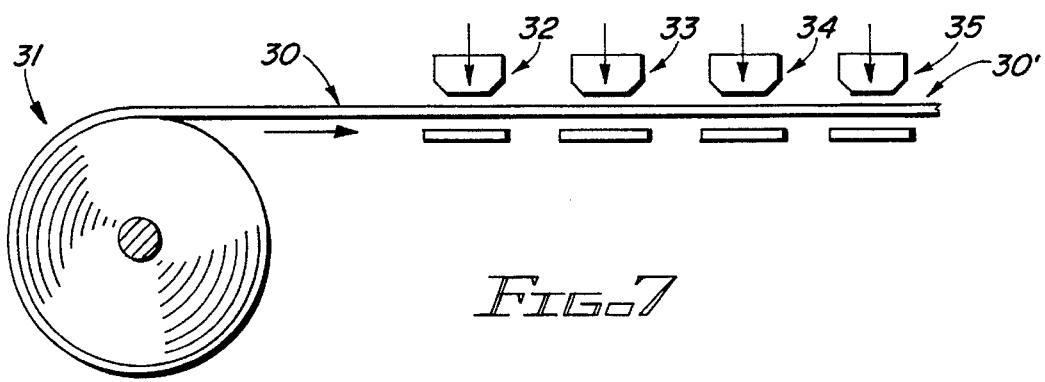
FIG. 7

PROCESS FOR FORMING ROLLER GUIDE FRAMES FOR A FISHING LINE

BACKGROUND OF THE INVENTION

1. Field of the Invention

This invention relates to a process for producing support frames for roller guides which are designed to movably guide and support a fishing line along the length of a fishing pole or rod.

2. Description of the Prior Art

Typically, in conventional fishing techniques, an elongated flexible fishing rod is used in combination with a reel mounted on the rod. A fishing line extends from the reel along the entire length of the rod and outwardly from a distal end or tip thereof. In order to maintain the fishing line in a proper, preferred orientation along the length of the rod, such fishing line is guided by a plurality of guide structures disposed in spaced apart relation to one another. In what may be considered a "lightweight" fishing gear, guide rings are utilized as the preferred guide structures in order to maintain the fishing line in the proper location along the length of the rod. However, in sportfishing involved in the catching of much larger fish, it is desirable to provide a plurality of roller type guides along the length of the rod. Such guides maintain the fishing line in the proper location as the line is reeled in or played out along the length of the heavy duty rod.

The purpose of such roller guide assemblies is of course to provide a minimal of friction or stress being exerted on the line as it travels along the length of the rod in either direction. The rollers therefor effectively roll in the same direction as the line travels. However, because of the lack of efficient roller design, the prior art structures frequently provide an unnecessary pressure, friction, etc. on the line itself. This causes a wearing of the line or a restriction of the freedom of the movement of the fishing rod and the fishing line during the "fighting" of the fish. Also, the production of such roller guides is by necessity somewhat meticulous in order that the structure of the roller guides is accurate in guiding and in supporting or contacting the fishing line as it moves to and from the reel. Accordingly, manufacture of such roller guide support structures must be precise while at the same time must be efficient in manufacturing such roller guides and in sufficient quantities. A major portion of the roller guide structure is the support frame on which a plurality of rollers are rotatably mounted. Such roller guide frame must be precise in its dimension and configuration and be formed of a material, such as metallic material, or aluminum of sufficient strength to maintain the structural integrity of the fishing line roller guides throughout their operative lifetime under what may be considered harsh environmental conditions.

The following U.S. patent is typical of a construction of a roller guide assembly of the type referred to herein while the process of the subject invention relates to the process of forming roller guides of such similar construction. Kovalovsky, U.S. Pat. No 4,428,141, discloses a line guide for fishing rods including a U-shaped support frame movably supporting a roller on a ballbearing type of assembly. The roller is mounted between side portions which are provided with a reduced central portion movably guiding the fishing line thereover. This patent discloses the use of a roller with a central angular indentation or partial groove type structure which only serves to minimally accommodate the fishing line but not effectively restrain it on the roller surface proper during movement of the rod.

Regardless of the widespread utilization of roller guides for guiding fishing line along the length of a somewhat heavy duty fishing rod, the process and/or method for producing these roller guides or a support frame portion of such guides needs improvement. Such a preferred method or process of manufacture should be efficient, precise, and be designed and capable of producing roller guide frames in sufficient quantity to handle the ever increasing demand.

SUMMARY OF THE INVENTION

The present invention relates to a process for manufacturing a support frame portion of a roller guide. Roller guides are typically used in somewhat heavy sportfishing rods to direct or guide as well as at least partially support the fishing line as it travels along the length of the fishing rod in either direction relative to the reel. The less stress or friction placed on the line during the "fighting" of the fish, the less need for repair or replacement.

Typically, in a conventional roller guide assembly, a support frame is made from a relatively high strength metallic material, such as aluminum, and includes an elongated base and two spaced apart side portions extending upwardly from the base in spaced, parallel relation to one another. Each of the side portions includes one or more apertures disposed in co-axial alignment with one another such that one or more roller assemblies can be placed between the side portions of the lower guide support frame so as to movably support the line and guide it during its movement, in either direction, along the length of the fishing rod. Also, two elongated mounting fingers having a somewhat flexible construction extend outwardly and downwardly from the base portion of the roller guide. These mounting fingers are used to attach the entire roller guide assembly to the upper or outer surface of the fishing rod in a position where a plurality of such roller guide assembly will be spaced along the length of the rod guiding and supporting of the fishing line.

It is important that the roller guide assemblies be made in an efficient, precise, and accurate manner in order that proper movable support of the fishing line be accomplished with a minimal amount of friction or stress being exerted thereon. To this end, the present invention is directed to a process of accurately and precisely forming the support frames of roller guides such that such roller guide frames may be made in high quantity without sacrificing accuracy in either dimension or configuration.

The present invention relates to a process for accurately and rapidly producing the support frame portion of a roller guide assembly. The subject process comprises supplying a continuous elongated strip of relatively high strength metallic material to a plurality of work stations. The work stations may be generally described as guide punching facilities or stamping facilities specifically adapted to form and shape the elongated metallic strip successively throughout each of the plurality of work stations until finally the last forming or shaping operation is performed at the last, end most work station on the then leading end of the elongated metallic strip. At this last, end most work station, the formed roller guide support frame is severed from the remainder of the elongated strip, still being formed and shaped. "Semiformed" roller guide frames are being simultaneously subjected to progressive forming and shaping at each of the adjacently positioned work stations. The transverse dimension or width of the elongated strip is such to accommodate the overall width or eventually the "height" of the formed roller guide support frame, while the length, as set forth above of the strip, is indefinite since a large number of plurality of such roller guides are going to be formed from this strip.

An important feature of the present invention is the simultaneous movement of each of the semi-formed roller guide frames precisely to the next most adjacent and succeeding work station for continued forming and shaping. This is accomplished by interconnecting the semi-formed roller guide frames by an elongated centrally disposed band which is an integral part of the original elongated strip. The band is formed from a cooperative shaping of certain ones of the plurality of punching or stamping facilities defining the work stations. The interconnection by the band of all the semi-formed roller guide frames serves to concurrently move or advance each of the semi-formed guides simultaneously to the next work station for the intended shaping or forming. The last, end most work station serves to perform the final forming or shaping function resulting in the formation of a completed or formed roller guide support frame. At the same time, this formed support frame defines the leading edge of the elongated strip and is severed or removed from the remainder of this strip and the plurality of semi-formed roller guide frames still being shaped.

Each of the die punch or stamping facilities defining each of the plurality of work stations are operated in synchronization such that each of these facilities come into forming and shaping engagement with the strip to form its intended shaping or forming procedure on the semi-formed roller guide frame at that particular work station on a concurrent or simultaneous basis. Of course, the strip is in the stop mode since it must be in a fixed position for the shaping or forming to be accurately and precisely formed. The "go" mode occurs as the strip of material and all of the semi-formed roller guide frames formed thereon advance simultaneously to the next adjacent and succeeding work station. The strip, therefore, advances periodically and at the same rate and simultaneously on a "stop and go" mode or basis.

BRIEF DESCRIPTION OF THE DRAWINGS

For a fuller understanding of the nature of the present invention, reference should be had to the following detailed description, taken in connection with the accompanying drawings in which:

FIG. 1 is a top view in partial cutaway of a material strip from which a product of the present invention is formed.

FIG. 2 is a top view of a semi-formed roller guide frame formed from the strip of FIG. 1 and passing through at least one work station.

FIGS. 3, 4, 5, and 6 are various top views in partial cutaway of semi-formed roller guide frames in various progressive steps of formation.

FIG. 7 is a top view of a completely formed roller guide frame removed from the leading edge of the strip 30 after processing has been completed.

Like reference numerals refer to like parts throughout the several views of the drawings.

DETAILED DESCRIPTION OF THE PREFERRED EMBODIMENT

Figure 8:
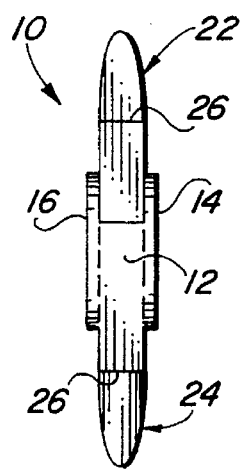
FIG. 8 is a side schematic view of a plurality of work stations performing a variety of stamping or forming operations on the strip of FIG. 1.

The present invention relates to a support frame 10 or 10' for a roller guide assembly and more particularly to a process of forming the roller guide frame. The support frame 10 is formed from a relatively high strength material such as aluminum or a like metallic material and includes an elongated base portion separating and interconnecting two side portions 14 and 16 extending upwardly or outwardly in a common direction and in spaced apart relation to one another such that the two side portions 14 and 16 are substantially parallel. One or more apertures 18, 19, 20 are formed in each of the side portions 14 and 16 wherein pairs of such apertures in the parallel side portion are disposed in co-axial relation to one another such that a roller assembly may be mounted in these co-axially aligned apertures. Mounting fingers 22 and 24 extend outwardly and downwardly from opposite ends of the base portion 12 of the roller guide frame 10 and 10' and are interconnected at a inner end 26 of such fingers 22 and 24 such that this inner end 26 is somewhat flexible to accommodate stress or force exerted on the overall roller guide assembly when it movably guides or supports a fishing line on a support rod as the fishing line travels along the length thereof.

The subject process comprises the feeding of an elongated preferably metallic material strip 30 of predetermined fixed width or transverse dimension into a plurality of adjacently positioned and cooperatively activating work stations 32, 33, 34, 35, etc. Each of the work stations may be defined by a die punch and/or stamping facility schematically represented in FIG. 8.

An important feature of the present invention is the feeding of the elongated strip 30 from a continuous supply 31 in a "stop and go" mode such that the strip 30 is advanced periodically along a path of travel. Such path of travel is defined by the number and disposition of the plurality of the adjacently positioned and cooperatively activatable work stations. The aforementioned stop and go mode of movement of the elongated strip is defined by periodic movement of the strip 30 to each of the succeeding work stations, simultaneously. Once at a given work station the strip 30 is stopped and the punch dies or stamping facilities defining each of the work stations 32, 33, 34, 35, etc. simultaneously pass or move into shaping or forming engagement with the segment of the die strip located at any given work station. Once the shaping or forming is performed, the strip 30 then passes into the "go" mode wherein each "semi-formed roller guide frames" (see FIGS. 2-6) passes to the next adjacent and succeeding work station. Therefore, it can be seen that the aforementioned periodic or stop and go mode of travel of the strip 30 relative to the path of travel defined by the plurality of work stations 32, 33, 34, 35, etc. is a periodic stopping of the strip 30 as it is shaped and formed, during the stop mode, and wherein each of the resulting semi-formed roller guide frames (FIGS. 2-6) passes onto the next adjacent work station during the go mode. The last, end most work station results in a complete formation of the roller guide frame 10 or 10' (see FIG. 7) wherein at this end most work station, the leading end of the strip 30' now defined by the completely formed roller guide frame 10, is severed or separated from the remainder of the strip 30 and the semi-formed roller guide frames (FIGS. 2-6) are each located or passing from corresponding preceding work stations.

This simultaneous movement of each of the semi-formed roller guide frames is accomplished through the formation of an integral elongated band 40 connected to the successively disposed semi-formed guide frames shown individually in FIGS. 2–6. The band 40 at one time was an integral part of the aforementioned elongated strip 30. This band 40 is centrally located and co-axial with the central, longitudinal axis of the elongated strip 30. The band 40 connects each of the semi-formed roller guide frames being worked on up until the leading end of the elongated strip 30 is formed into a completed roller guide frame 10 and separated from a remainder of the band 40 still interconnecting the remainder of the semi-formed guide frames of FIGS. 2–6.

Another feature of the process is the formation of the strip 30 or correspondingly positioned segments of the elongated strip into a base portion 12 of the roller guide frames 10 or 10' being formed. In addition, the band also forms the aforementioned mounting fingers 22 and 24 which serve to flexibly interconnect the roller guide frame 10 or 10' to the fishing rod in the desired location.

The central location of the elongated band 40 and the resulting formation of the base portion 12 of each of the roller guide frames is due to the fact that the plurality of work stations are cooperatively structured to form, through for example the formation of apertures 18, 19 and 20, onto each side of the band 40 or base 12 in equally spaced relation to one another and the formation and shaping, individually of the side portions 14 and 16 of the frame. As the strip is advanced in the aforementioned periodic or "stop and go" mode, first one side portion on one side (FIG. 3) of the band 40 is shaped and formed to extend outwardly from the band 40 in co-planar relation thereto. Subsequently, the next or succeeding work stations form and shape the other side portion of the semi-formed roller guide frame (FIG. 4) such that the two side portions are disposed in co-planar relation to one another and extend outwardly from the centrally located elongated band 40 which eventually is shaped into the base portion 12 of each of the roller guide frames. The aforementioned predetermined width of the elongated strip 30 is substantially equivalent to the spacing between the outermost peripheries of the side portions 14 and 16 of a semi-formed roller guide frame at the farthest point from one another. In other words, the width of the strip 30 of FIG. 1 is substantially the same as the width of the semi-formed guide frame of FIG. 4.

Succeeding steps of upstream work stations serve to simultaneously or independently bend the side portions 14 and 16 out of their co-planar relationship to one another (FIG. 4) and into spaced apart, substantially parallel relation to one another (FIG. 5) and in perpendicular or substantially transverse relation to the band 40 or the resulting base portion 12 formed by the band 40 and extending along the length of the side portions 14 and 16 and also therebetween.

Yet further succeeding work stations defined by the stamping facilities 32, 33, 34, 35, etc., as set forth above, serves to bend or position the base portion 12 disposed between the side portions 14 and 16 and along the length thereof of each roller guide frame out of the plane of the mounting fingers 22 and 24 also defined by and originally being an integral part of the elongated band 40. Further shaping and forming of the mounting fingers 22 and 24 allow the flexibility of the eventually formed roller guide assembly once mounted to the properly located surface on the fishing rod. This flexibility is important so as to reduce the friction and/or stress exerted on the fishing line as it travels along the length of the fishing pole both into and out of the fishing reel.

It should therefore be apparent that once the elongated strip 30 extends along the entire path of travel of the work stations (FIG. 8) and is positioned to be shaped or formed by each of the plurality of work stations 32, 33, 34, 35, etc. and the stamping or punching facilities located thereon, each downward and simultaneous movement of the plurality of facilities at these work stations into engagement with the strip 30, will result in the final formation of a completed roller guide frame 10 and a removal of such completed roller guide frame 10 from the leading end 30' of the elongated strip 30 and the remaining semi-formed roller guide frames (FIGS. 2–6) being formed or shaped at each of the preceding work stations.

Figure 9:
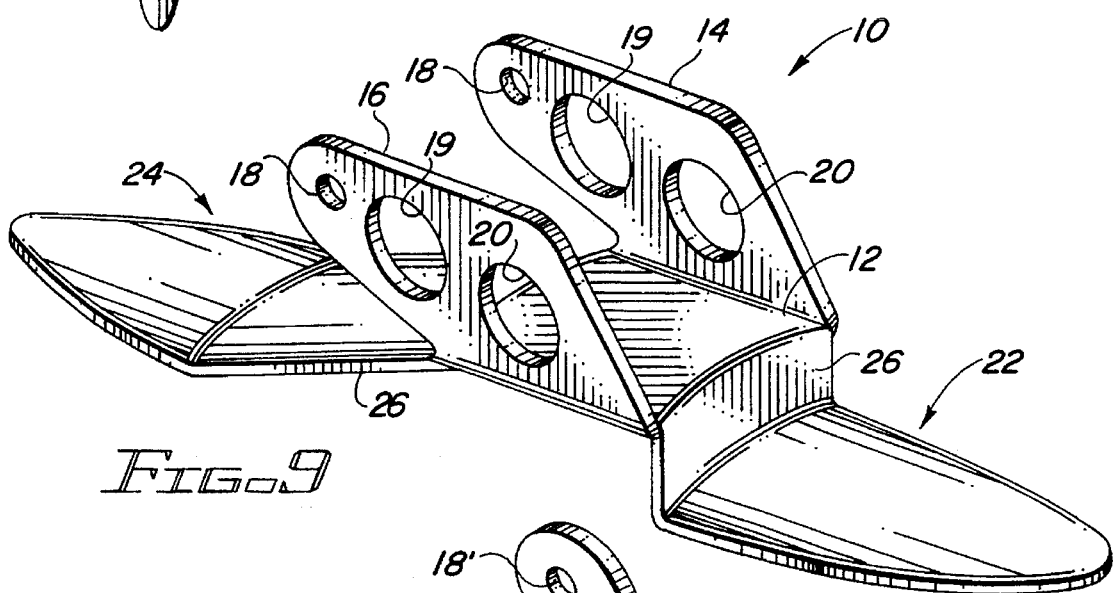
FIG. 9 is a perspective view of a completed roller guide frame of the present invention.
Figure 10:
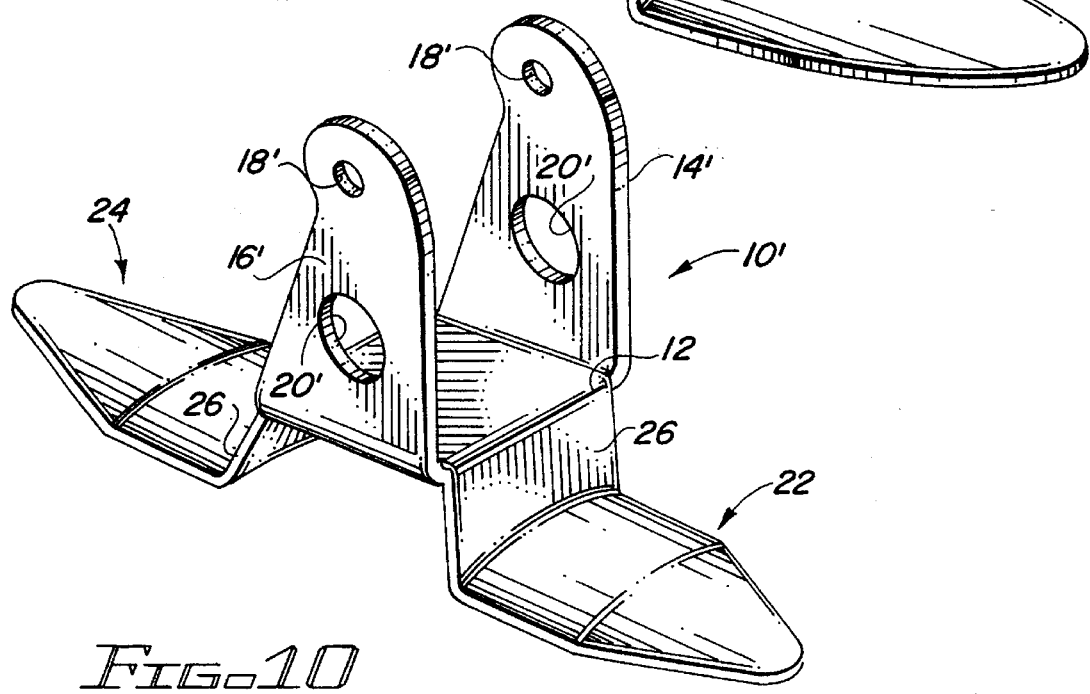
FIG. 10 is another embodiment of a completed roller guide frame similar to the embodiment of FIG. 9.

FIG. 10 is a different structural embodiment of a completed roller guide frame from that shown in FIG. 9.

Wherein a fewer number of apertures as at 18' and 20' are formed in the side portions 14' and 16' and further wherein remaining portions such as base 12, fingers 22 and 24, and inner ends 26 of the mounting fingers 22 and 24 are formed in a similar fashion to the base 12 as that of the embodiment of FIG. 9.

Now that the invention has been described,

What is claimed is:

1. A process for forming roller guide frames designed to movably support a fishing line on a fishing rod, said process comprising the steps of:

a) feeding an elongated strip of a metallic material having a predetermined width to a plurality of adjacent work stations, b) defining each of said plurality of work stations by a punching and stamping assembly in spaced relation to one another along a path of travel of said elongated strip, c) defining said predetermined width of said elongated strip sufficiently in transverse dimension so as to form oppositely disposed side portions of a sufficient intended length on each of a plurality of semi-formed roller guide frames, d) forcing movement of said elongated strip along the path of travel in a periodic, stop and go mode, e) driving each of said punching and stamping assemblies of said plurality of work stations simultaneously into forming engagement with said elongated strip when said elongated strip is in a stop mode along the path of travel, f) removing a formed roller guide frame from said elongated strip and said plurality of work stations to define a go mode of said elongated strip along the path of travel, g) successively forming said oppositely disposed side portions on each of said plurality of semi-formed roller guide frames to extend outwardly from opposite sides of said elongated strip and in co-planar relation thereto and to one another, h) forming an elongated band on said elongated strip which is integrally and fixedly connected between each of said plurality of semi-formed roller guide frames and adapting said elongated band to simultaneously move said plurality of semi-formed roller guide frames to a next successively disposed one of said plurality of work stations, i) forming a segment of said elongated band extending between said oppositely disposed side portions to define a base portion of each respective one of said plurality of semi-formed roller guide frames, j) subsequently bending each of said side portions of each of said plurality of semi-formed roller guide frames out of a co-planar relation and into spaced, parallel relation to one another, and into transverse relation to said elongated band, and k) removing a formed roller guide frame from said elongated strip and the plurality of semi-formed roller guide frames at a last, end most one of the plurality of work stations.

2. A process as in claim 1 comprising extending the length of said elongated band along at least a majority of the length of the path of travel defined by the plurality of work stations.

3. A process as in claim 2 comprising extending the length of said elongated band along the length of said path of travel defined from a location of a second of said plurality of work stations to the last, end most one of the plurality of work stations.

4. A process as in claim 2 comprising forming the elongated band substantially co-axial with a central longitudinal axis of the elongated strip.

5. A process as in claim 4 comprising successively shaping and removing material on opposite sides of the elongated band to successively form the plurality of semi-formed roller guide frames and produce the completely formed roller guide frames at the last, end most work station.

6. A process as in claim 1 comprising subsequently forming a segment of the elongated band extending between and along the length of the transverse side portion of each semi-formed roller guide frame into a base portion thereof.

7. A process as in claim 6 comprising separating a formed roller guide framed from a leading end of the elongated strip at the last, end most work station by severing the formed base portion of the formed roller guide frame from a remainder of the elongated strip disposed adjacent to and upstream of the last, end most work station.

* * * * *